June 19, 1962 — H. HORNSCHUCH ET AL — 3,039,442

MOTOR OPERATIVE BY ACTION OF A FLUID EXPANSIBLE MEMBRANE

Filed Dec. 1, 1960 — 5 Sheets-Sheet 1

INVENTORS
HANNS HORNSCHUCH
JACK R. WEBB
BY
THEIR ATTORNEY

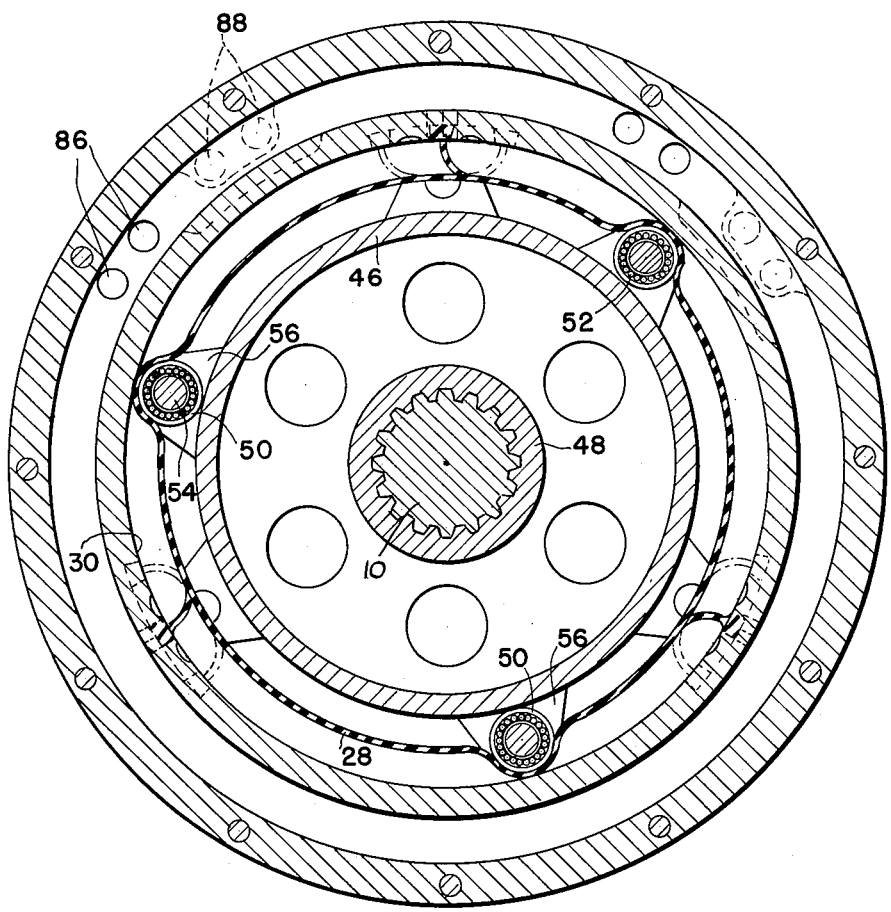
FIG. 3
INVENTORS
HANNS HORNSCHUCH
JACK R. WEBB
BY 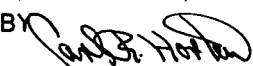
THEIR ATTORNEY

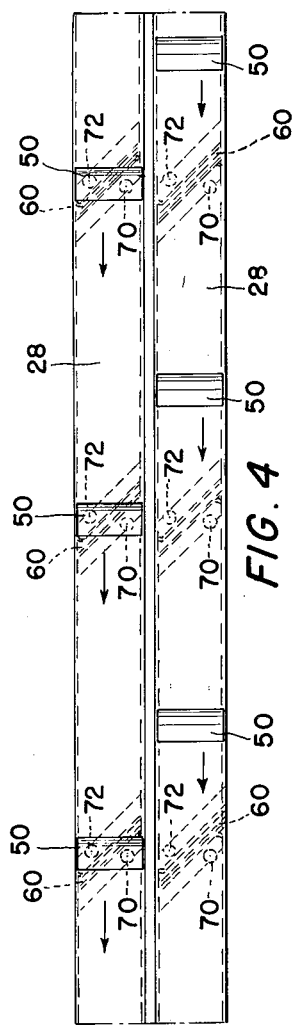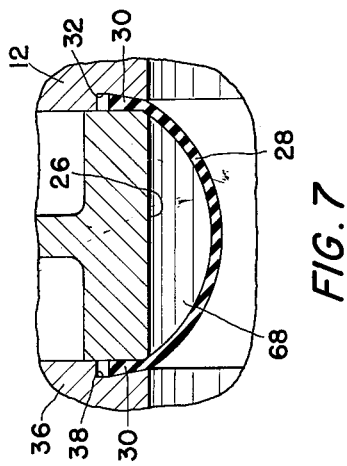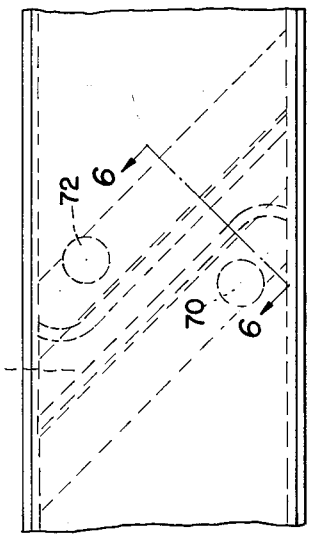

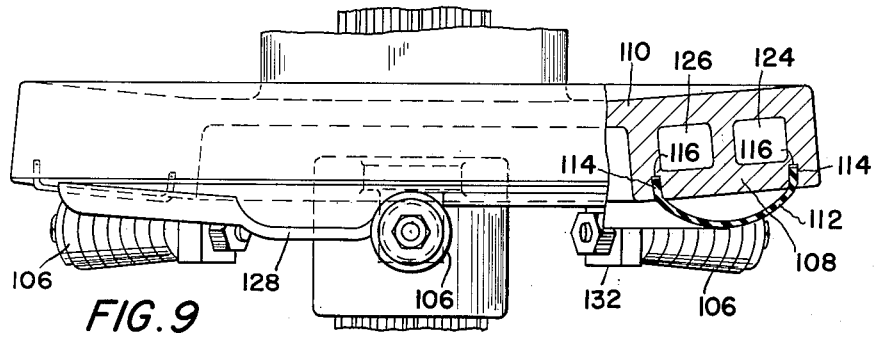
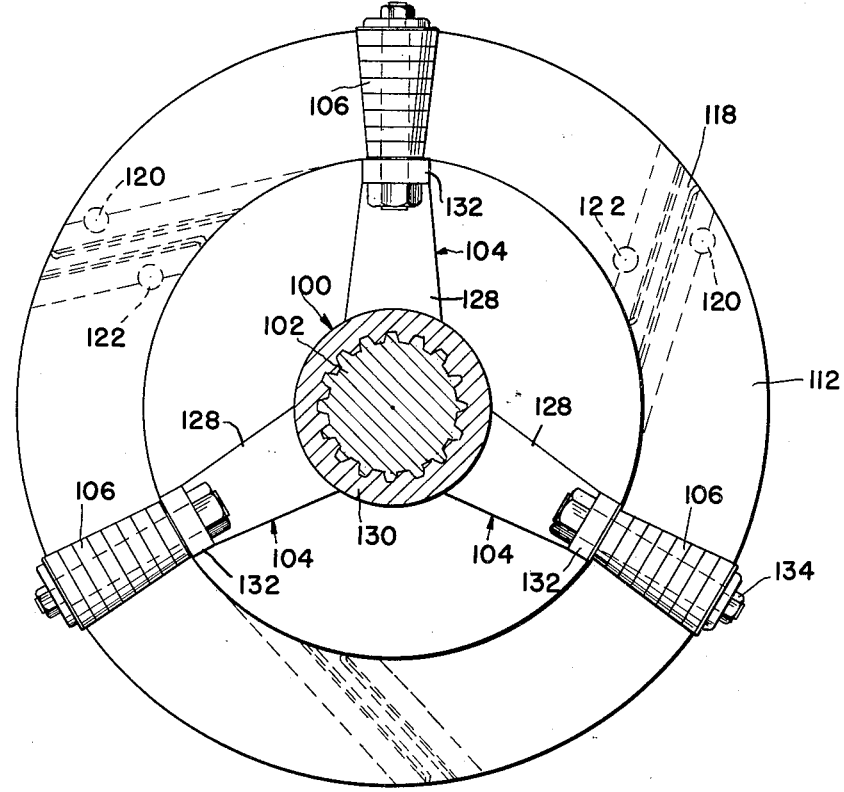

United States Patent Office 3,039,442
Patented June 19, 1962

3,039,442
MOTOR OPERATIVE BY ACTION OF A FLUID
EXPANSIBLE MEMBRANE
Hanns Hornschuch, Easton, and Jack R. Webb, Bethlehem, Pa., assignors to Ingersoll-Rand Company, New York, N.Y., a corporation of New Jersey
Filed Dec. 1, 1960, Ser. No. 73,039
5 Claims. (Cl. 121—48)

This invention relates to motors and particularly to fluid actuated motors.

Motors of the type to which this invention relates have heretofore been provided with a member more or less in the nature of a hose into which a fluid is injected to drive a compressing roller or similar member progressively along its length. Generally this type of motor is of the rotary type in which the hose lies on the circular path starting at a fluid inlet and terminating at a discharge point. As heretofore constructed these motors have had a number of disadvantageous characteristics amongst which may be mentioned a creeping of the hose element and the difficulty of providing suitable inlet and outlet passages which allows the driven member to ride smoothly thereover.

It is an object of this invention to improve the construction of the actuating element so that it shall be durable, smooth operating, powerful and reliable.

Other objects of the invention will be in part obvious and in part pointed out hereinafter.

Figure 1:
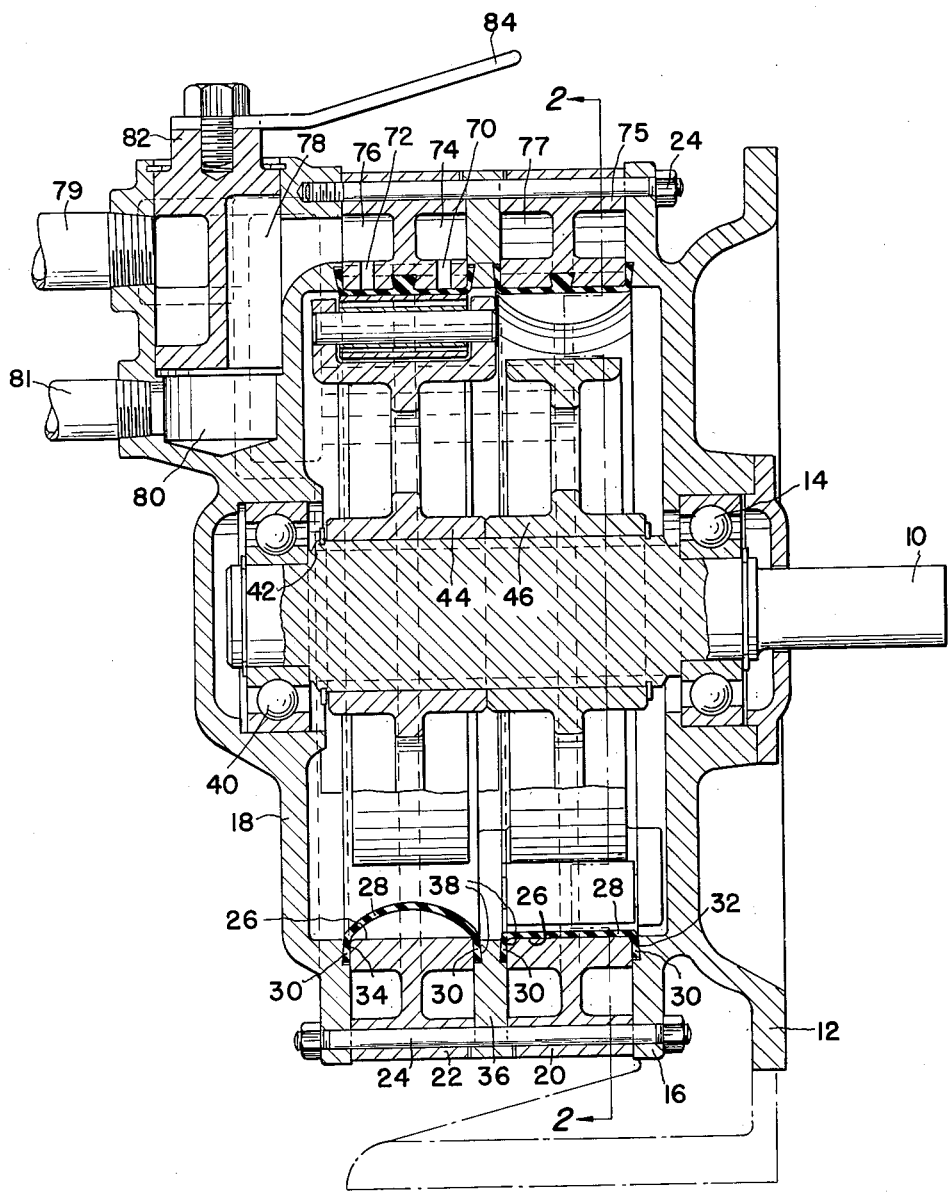
Figure 2:
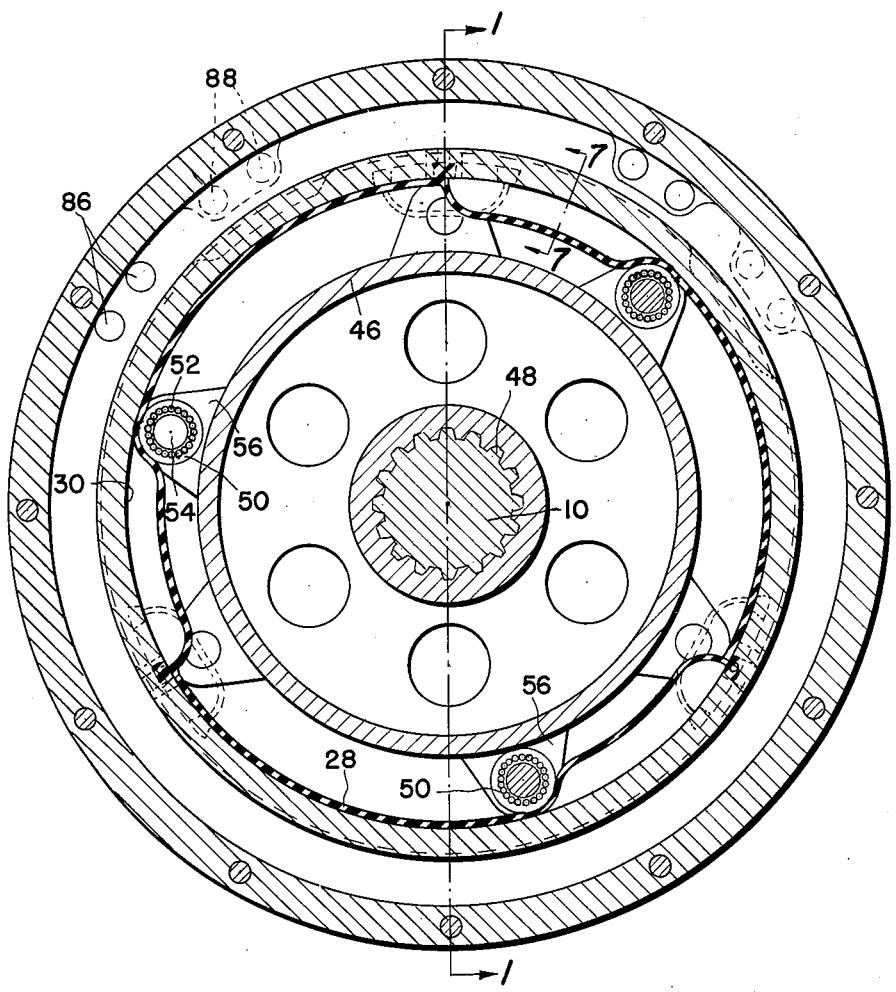

The drawing illustrates an improved form of motor embodying the invention and includes FIGURE 1, a cross section of the motor taken longitudinally of the driven shaft, FIG. 2 is a section taken along the line 2—2 of FIG. 1 looking in the direction of the arrows and indicating at the line 1—1 and its arrows the section along which FIG. 1 is taken and the direction of view, FIG. 3 is a view similar to FIG. 2 showing the mechanism in a braking condition when inlet and exhaust ports are simultaneously restricted, FIG. 4 shows a developed view of a pair of flexible actuating members with the rollers which ride thereon in side by side relation but staggered to produce constant torque, FIG. 5 is a view of a section of the flexible member provided with a partition and illustrating the arrangement of admission and exhaust passages, FIG. 6 is a section taken along the line 6—6 of FIG. 5 looking in the direction of the arrows, FIG. 7 is a sectional view taken along the line 7—7 of FIG. 2 looking in the direction of the arrows, FIG. 8 is an alternative form of rotor showing in plan the arrangement wherein the rotary path and the actuating flexible member is in the form of a ring, and FIG. 9 is a side view of the motor disk arrangement shown in FIG. 8, parts being cut away to show the interior construction.

Referring to the drawing and particularly the motor of FIGS. 1–7 inclusive, there is illustrated a form which is adapted to rotate a rotary shaft 10 suitably journaled on a frame 12 provided with anti-friction bearings 14 and carrying between a circular flange 16 and a head portion 18 a pair of support members 20 and 22 the assembly being suitably tied together by a ring of bolts 24.

Each support member 20 and 22 is provided with a face portion 26 which is cylindrical and in this instance on the internal side of the support members. The cylindrical paths thus constituted are coaxial with shaft 10, and each carries on its face flexible means expansible away from face portion 26. To this end are provided flexible strips 28 which may be of rubber or some suitable flexible elastic material which will normally contract to lie flat on path or face 26. Strips 28 may be a continuous strip with outwardly extending side edges 30. A great advantage of the use of a membrane in tension for this purpose is that it provides very little bending. This produces greater life and strength both at its sides and at its ends.

The outer side edge 30 of one of the strips 28 is adapted to be clamped in place between support member 20 and frame 12 at a notch 32 formed in frame 12 while the outer side edge of the other strip 28 is adapted to be clamped in place by the support member 22 and head 18 at a notch 34, similar to notch 32, formed in head 18. The inner edges 30 of each of the strips 28 are adapted to be held in place at notches 38 formed in a clamping ring 36 which is disposed between support members 20 and 22.

Shaft 10 is provided with a bearing 40 in head 18 and has a hub like portion 42 to carry a pair of rotors 44 and 46 entirely similar to each other and having a splined central connection with shaft 10 as indicated at 48 in FIG. 2.

Each rotor 44 and 46 carries a plurality of equally spaced rollers 50 having needle bearings 52 to rotate upon transverse pins 54 carried by flanges 56 extending from the rotors. Rollers 50 ride upon flexible members 28 and as they ride, rotors 44 and 46 press them against members 28 to flatten them sufficiently to prevent leakage of any fluid by them.

As indicated in FIG. 4, the flexible strips 28 are discontinuous since at equally spaced intervals in the lengths of the strips 28 there are spaced partitions provided at 60 which extend diagonally across the width of the strips. The partitions form, with face portions 26 and strips 28, a plurality of channels or chambers 68. The partitions are formed by providing each strip 28 with a plurality of hollow beads 62 which fit into grooves 64 formed in face portions 26 of support members 20 and 22. As best shown in FIG. 6, grooves 64 are of dove-tail form and the hollow beads are held within their respective grooves 64 by an expander member 66. As indicated in FIG. 4, each flexible strip 28 is provided with three partitions, corresponding in number to the three rollers 50, to thereby divide each strip 28 into three chambers 68 (FIG. 7). Into these chambers 68 a fluid under pressure is injected therein to expand such chambers 68 for urging rollers 50 to rotate, and thus propel the rotors 44 and 46 attached to shaft 10. To this end motive fluid is supplied to chambers 68 by passage means which includes ports 70 which are provided in support members 20 and 22. Similar ports 72 are provided which act as exhaust ports. Rollers 50 are adapted to pass over ports 70 and 72 substantially simultaneously so that admission and exhaust are closed at the same time. As roller 50 passes over the inlet port, the chamber 68 behind it fills with fluid and presses against roller 50 to propel it. Since there are in this instance three rollers 50, the force totaling three times that against each roller will be exerted on each of the rotors 44 and 46.

Whatever fluid may have been in chamber 68, ahead of roller 50, will be exhausted out through an exhaust port which, in the direction of rotation as shown in FIG. 4 by the arrow, would be a port 72. Also the construction will act as a braking mechanism when admission and exhaust are restricted as will be readily understood by reference to FIG. 3. All ports 70 in support member 22 communicate with a ring groove 74 and all ports 72 in that support member communicate with a similar ring groove 76. As is seen in FIG. 1, groove 76 connects with a passage 78 in head 18, and groove 74 communicates with a passage 80, likewise in head 18. A valve 82 of the three way type is adapted to alternatively connect chamber 78 with the inlet pipe 79 or exhaust pipe 81. Thus, grooves 74 and 76 may be alternatively inlet or exhaust passages depending upon the desired direction of rotation of shaft 10. For controlling valve 82 a suitable handle 84 is provided.

In support 20 and for actuating rollers 50 carried by rotor 46, the ports 70 and 72 are connected to ring grooves 75 and 77 entirely similar to grooves 74 and 76, respectively. Grooves 74 and 75 are interconnected by ports 86 while grooves 76 and 77 are interconnected by ports 88.

As noted in FIG. 4, the two sets of rollers 50 provided on rotors 44 and 46 are staggered. This is to avoid dead points at which in one set of rollers the inlet and exhaust ports 70 and 72 are simultaneously closed. Being thus staggered the power applied to one of the rotors 44 or 46 carries the other over the dead point and continuous power is supplied. While only two rotors 44 and 46 are shown, there may be of course any desired number.

The alternative construction shown in FIGS. 8 and 9 provides a rotor 100 for driving shaft 102 with a splined connection, there being radial extending arms 104 carrying at their ends tapered rollers 106 to travel on a beveled annular face 108 provided on support 110. Flexible member 112 is in this instance provided with edges 114 carried in the tapered grooves 116 in the face 108. As indicated in FIG. 8 there are three rollers 106 and accordingly flexible member 112 is divided into three sections having angularly disposed partitions 118 separating ports 120 and 122 corresponding to ports 70 and 72 which may alternatively be inlet or exhaust ports communicating with ring grooves 124 and 126 suitably associated with fluid supply or exhaust.

Each rotor 100 has outwardly extending arms 128 attached to a hub portion 130 each of portions 128 being flat with a turned up end 132 adapted to receive a bolt 134 passing through the sectionalized roller 106 which is suitably tappered to fit tightly onto flexible member 112 to press it against the face 108. Portion 128 may be flexible and springy to provide resilient contact of roller 106 on member 112.

Thus, by the above construction are accomplished, among others, the objects hereinbefore referred to.

We claim:

1. A motor comprising a support having a face portion constituting an elongated cylindrical path, flexible means arranged in a plurality of separated sections on said face portion expansible away from said face portion, rider means on said flexible means, means to press said rider means against said flexible means and to guide said rider means on said path, said support being provided with passage means at said face portion to admit live fluid to each section of said flexible means behind said rider means for expanding said sections of said flexible means, and passage means at each section of said flexible means controlled by said rider means to exhaust such motive fluid, said exhaust passage means being in said path in a position substantially at said admission passage means of the corresponding flexible section means with respect to the direction of motion of said rider means.

2. A motor comprising a support having a face portion constituting an elongated annular path, flexible means on said face portion expansible away from said face portion, rider means on said flexible means, means to press said rider means against said flexible means and to guide said rider means on said path, said support being provided with passage means at said face portion to admit motive fluid to said flexible means behind said rider means for expanding said flexible means, and passage means controlled by said rider means to exhaust such motive fluid, said exhaust passage means being in said path in a position substantially at said admission passage means with respect to the direction of motion of said rider means.

3. A motor comprising a support having a face portion constituting an elongated path, a flexible strip sealingly mounted on said path, rider means on said flexible strip, means to press said rider means on said flexible means and to guide said rider means on said path, said flexible strip defining wtih said face portion an expansible chamber cooperable with said rider means to urge said rider means along said path, said support being provided with passages at said face portion to admit motive fluid to said expansible chamber to cause expansion of said flexible strip behind said rider means, and passage means controlled by said rider means to exhaust such motive fluid from said expansible chamber, said flexible strip being provided with spaced apart diagonal partition means at which said admission and exhaust passage means are adjacent laterally, said admission passage means being positioned substantially adjacent said exhaust passage means with respect to the direction of rider means motion.

4. A motor comprising a support having an annular face portion, a continuous annular flexible strip sealingly mounted on said face portion, a plurality of rider elements, means for supporting said rider elements in impinging relationship with said flexible strip and to guide said rider elements in a movement in a circular path, said annular face portion having a plurality of spaced, transversely extending grooves therein, said flexible strip having a plurality of spaced, transversely extending beads receivable in a fluid tight manner in the grooves of the face portion to form partitions which define with said face portion and said flexible strip a plurality of expansion chambers cooperable with said rider elements to urge said rider elements upon expansion of said chambers in a circular path, fluid inlet means in said support at said face portion and adjacent a partition for each of said expansion chambers to admit fluid to each of said expansion chambers to cause expansion of the flexible strip behind each of said rider elements and movement of the rider elements in a circular path, and fluid exhaust means in said support at said face portion and adjacent a partition for each of said expansion chambers to exhaust fluid in said expansion chambers ahead of said rider elements, said fluid inlet means associated with one of said expansion chambers being disposed adjacent one side of a partition separating two next adjacent expansion chambers and the fluid exhaust means of the next adjacent expansion chamber being disposed adjacent the opposite side of the partition.

5. A motor comprising a support having a plurality of face portions, each face portion providing an elongated path, flexible means for each of said face portions, each flexible means arranged in a plurality of separated sections on a face portion, each of which sections is expansible away from the associated face portion, a rider means for each of said flexible means, a mounting member supported for rotation by said support, each of said rider means including a plurality of equally spaced rollers corresponding in number to the number of sections of a flexible means, connecting means for each rider means for connecting the latter to said mounting member with the rollers thereof in impringing relation against the associated flexible means, inlet passage means for each of said sections of a flexible means at the associated face portion to admit motive fluid to each of the sections to expand said flexible means behind each roller of a rider means and thereby urge the rollers along said path, exhaust passage means for each of said sections of a flexible means at the associated face portion controlled by the rollers to exhaust motive fluid from each section ahead of each roller, said exhaust passage means and said inlet passage means for each of the next adjacent sections of a flexible means being arranged in pairs so that a roller may simultaneously close both exhaust and inlet passage means of a pair, said rollers of each of said rider means being arranged in staggered relation to each other so that pairs of exhaust and inlet passage means of at least one of the flexible means are open at all times.

References Cited in the file of this patent

UNITED STATES PATENTS 2,428,619     Douglas _____ Oct. 7, 1947

FOREIGN PATENTS

681     Great Britain _____ May 1, 1902